Sept. 3, 1946.  I. WOLFF  2,407,199
COMMUNICATION AND DISTANCE DETERMINING SYSTEM
Filed June 29, 1940  2 Sheets—Sheet 1
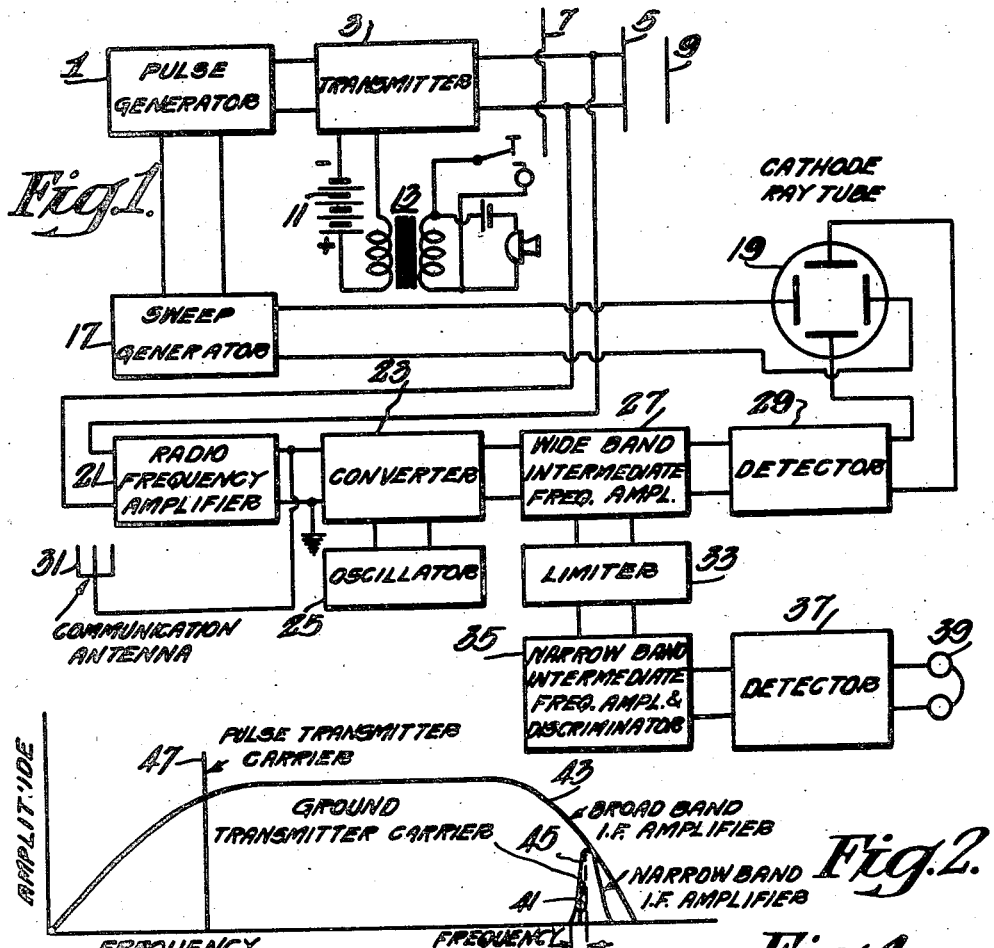
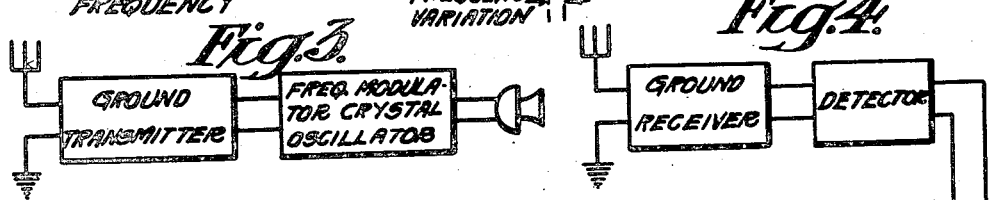
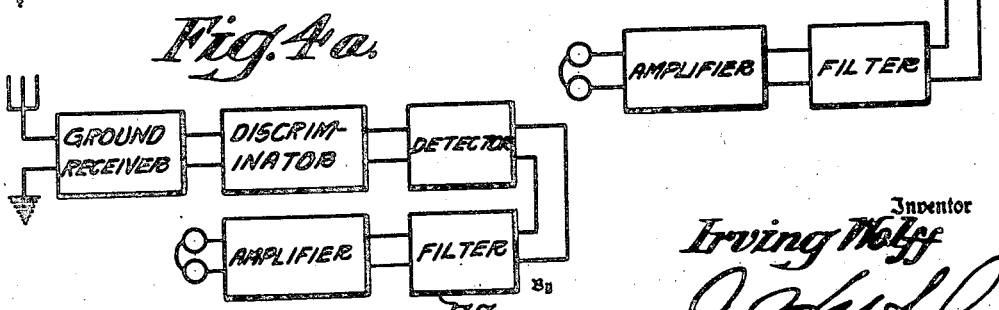
Inventor
Irving Wolff Inventor
Irving Wolff
Attorney Patented Sept. 3, 1946

2,407,199

UNITED STATES PATENT OFFICE 2,407,199

COMMUNICATION AND DISTANCE DETERMINING SYSTEM

Irving Wolff, Merchantville, N. J., assignor to Radio Corporation of America, a corporation of Delaware Application June 29, 1940, Serial No. 343,133

22 Claims. (Cl. 250—1)

This invention relates to a system for the communication of intelligence and for the detection of objects and a determination of their distance. More specifically objects are detected and their distance determined by means including a radio pulse transmitter and receiver. The same means are utilized for the communication of intelligence which is accomplished by amplitude or by frequency modulation of the pulse transmitter. The system may be used simultaneously for measuring and communicating without impairing either service as will be hereinafter explained.

Systems for the measurements of distance and the detection of obstacles are known to those skilled in the art. One important use of such systems is on aircraft from which radio pulses are radiated to be reflected from the ground or from an object in the flight path to indicate respectively the altitude of the craft and the danger of collision or the distance to an object on the course of the craft. While such devices are very helpful to the navigator their weight and size have to be considered by the operators of commercial and other aircraft because the apparatus weight must be subtracted from the useful load. If the same apparatus could be employed in communication, it could be substituted for one of the standard communication radio sets which are carried on commercial aircraft. While the alternate uses of such radio device might be readily arranged, the simultaneous use for two purposes without interference is not without difficulties which are solved by the means disclosed in the instant invention.

It is one of the objects of the present invention to provide means for the indication of a wave reflecting object and for the communication of intelligence simultaneously. Another object is to provide means for indicating distance by the reflection of spaced pulses of radio frequency energy and for communicating by varying the amplitude or frequency of said pulses. Another object is to provide means whereby a common transmitter and common receiver may be used, respectively, to transmit spaced pulses for distance indication and to modulate said pulses for communication, and to receive the spaced pulses after reflection from an object whose distance is to be determined, and to receive simultaneously communication signals from another transmitter.

Figure 5:
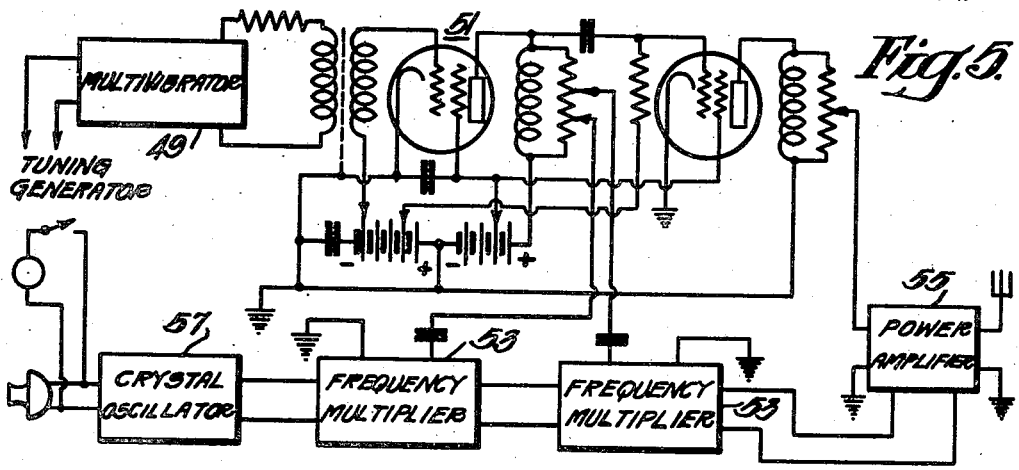
Figure 6:
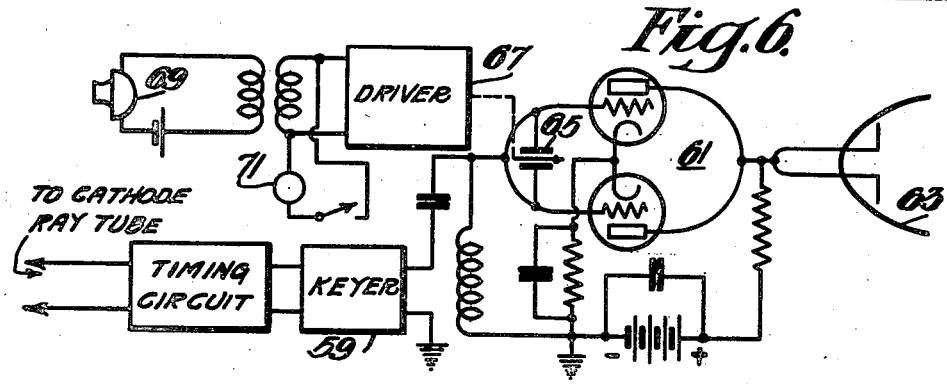
Figure 7:
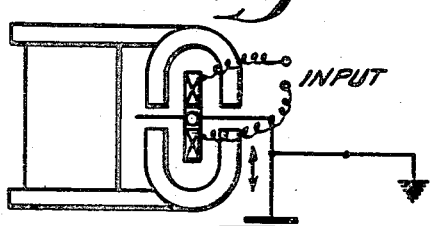
Figure 8:
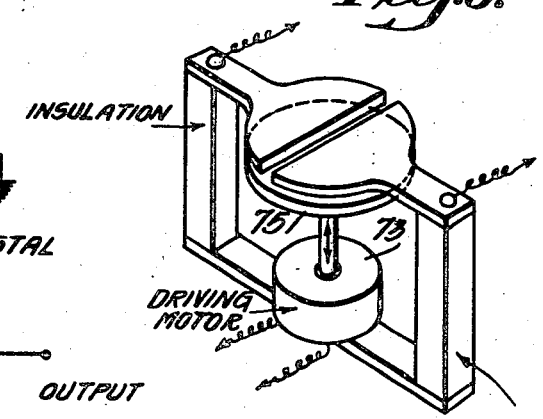

The invention will be described by referring to the accompanying drawings in which Fig. 1 is a schematic circuit diagram of one embodiment of the invention; Fig. 2 is a graph illustrating characteristics of the frequency spectrum of the device; Fig. 3 is a schematic circuit diagram of a ground transmitter; Figs. 4 and 4a are schematic circuit diagrams of a ground receiver responsive to amplitude modulation and frequency modulation, respectively; Fig. 5 is a schematic circuit diagram of a modified transmitter, which includes a frequency modulated master oscillator; Fig. 6 is a schematic circuit diagram of a modified frequency modulated transmitter; Fig. 7 is a perspective view of one form of modulator for a piezo electric crystal; and Fig. 8 is a perspective view of a capacitor modulator.

Referring to Fig. 1, a pulse generator 1, is connected to a transmitter 3 which is coupled to an antenna 5. The antenna may include one or more reflectors 7 or directors 9. The transmitter includes thermionic tubes which are supplied with anode current from a battery 11 or other power source. The anode circuit is serially connected through a transformer 13 which is connected to a microphone 15 or other signalling device such as a telegraph key and alternator. The pulse generator 1 is connected to a sweep generator 17 which is in turn connected to the horizontal deflecting elements of a cathode ray tube 19.

The distance indication receiver which may be connected to the transmitting antenna as described in the copending application Serial No. 184,354, filed January 11, 1938 by Irving Wolff and William D. Hershberger, includes a radio frequency amplifier 21, a converter 23 and oscillator 25, a wideband intermediate frequency amplifier 27, and a detector 29 which is connected to the vertical deflecting elements of the cathode ray tube 19.

The receiver also includes the following elements for reception of the communication signals from a ground transmitter. A communication antenna 31 (which is preferably connected directly to the converter 23), a limiter 33, which is connected to the wide band amplifier 27, a narrow band intermediate frequency amplifier and discriminator 35, and a detector 37 which is connected to telephone receivers or other signal reproducer 39.

The operation of the system for the indication of distance or detection of wave reflecting objects is as follows: Sharply defined pulses are applied to the transmitter 3 at regular intervals and simultaneously the cathode ray sweep is started. Radio waves, corresponding to each pulse, are radiated from the antenna 5 toward a wave reflecting body. The reflected waves induce pulse currents in the antenna. These pulse currents are applied to the receiver. There the pulses are amplified, and, after demodulation in the detector 29, are applied to the cathode ray tube vertical deflecting elements. Thus the horizontal sweep of the cathode ray is altered by the application of a vertical deflecting potential. Since the horizontal sweep may be calibrated to indicate distance, it follows that the distance may be determined by observing the vertical peaks in the sweep. Instead of using a horizontal sweep, the sweep may be made circular with a radial deflection for signal indication. It should be noted that the distance is independent of the amplitude of the reflected signal and is dependent only on the time of propagation to and from the reflecting object as measured by the cathode ray sweep.

If the amplitude of the pulse of the transmitter 3 is varied by the application of voice modulation currents, or other signal currents, the distance measuring function will be uninterrupted because the distance measurement is independent of pulse amplitude. If a receiver, such as shown in Fig. 4, is made responsive to the voice modulated pulses, the demodulated signals will include the voice signals, which may be separated from the carrier pulse signals by filtering. Thus distance measurements and signal communication may be used simultaneously from the vehicle carrying the transmitter.

Voice or telegraphic signals may be transmitted to the receiver on the vehicle by radiating frequency modulated signals from a ground transmitter such as shown in Fig. 3. The transmitter may be of any conventional type. By way of example the frequency modulator may be of the crystal oscillator type shown in Fig. 7 and claimed in the copending application Serial No. 336,550, for "Modulation system," filed May 22, 1940, by Robert J. Ehret and John L. Barnes, Patent No. 2,289,183, dated July 7, 1942. The carrier or midfrequency 41 of the ground transmitter is preferably positioned on the curved portion of the broad band intermediate amplifier response 43 and about the center of the sloping portion of the narrow band amplifier response 45 as shown in Fig. 2. This places the frequency of the ground transmitter at a point sufficiently remote from the pulse carrier frequency 47 to avoid overloading the broad band amplifier and to minimize interference. Furthermore, the limiter 33 attenuates the pulse signals to minimize pulse as well as other types of interference. The frequency position of the ground transmitter carrier on the sloping portion of the narrow band response provides frequency discrimination for the conversion of the frequency modulated signals into amplitude modulated signals which may be demodulated by a conventional detector 37.

The aircraft transmitter may be frequency modulated by means of the circuit shown in Fig. 5. A multivibrator 49 is connected to a pulse amplifier 51, which may be of the type disclosed in the copending application Serial No. 279,542, filed June 16, 1939, by Irving Wolff. The pulse amplifier 51 is used to key one or more frequency multipliers 53 and a power amplifier 55. The frequency modulated currents impressed on the frequency multipliers are derived by modulating a piezo electric or crystal oscillator 57. The modulation currents may be voice or telegraphic signals, which are applied to the crystal oscillator by means previously mentioned and illustrated in Fig. 7.

The transmitter may be arranged according to the diagram of Fig. 6 in which a keyer 59 is coupled to a self-excited oscillator 61, which is coupled to a directive antenna 63. The grid circuit of the oscillator includes a capacitor modulator 65, which is driven by a driver 67. The driver is energized by voice or telegraphic signals from a microphone 69 or keyed generator 71, respectively. The mechanical arrangement of the capacitor modulator is shown in U. S. Patent 2,257,830, which issued on application Ser. No. 293,128, filed September 1, 1939, by Irving Wolff and Royden C. Sanders, Jr. If the driving motor 73, which operates the movable plate 75, is "stiffness" controlled, the device will frequency modulate the self-excited oscillator 61. In the event that frequency modulation is used to transmit the communication signals to the ground receiver, a circuit for the reception of frequency modulation waves should be used in the ground receiver. The schematic arrangement of such receivers is shown in Fig. 4a; the details of the circuits are well known to those skilled in the art. A filter 77 is included to separate the communication signals from the pulse signals.

Thus the invention has been described as a transmitter which radiates sharply defined pulses for measuring distance by reflection and which simultaneously modulates the same pulses for communication. The modulation may be of the frequency or amplitude type. The receiver for distance measurement includes a broad band amplifier and a cathode ray indicator. For reception of communication signals the broad band amplifier is connected through a limiter and a narrow band amplifier to a detector and signal indicator. The narrow band amplifier is adjusted so that it acts as a discriminator. To avoid overloading the broad band amplifier, and to minimize interference from the pulse transmitter, the communication carrier frequency is located near the limit of the frequency response of the broad band amplifier.

I claim as my invention:

1. A system for the simultaneous detection of wave reflecting objects and the transmission of intelligence including means for radiating discrete pulses at a pulse carrier frequency which may be filtered with respect to the frequency of said intelligence transmission, means for receiving said pulses after reflection, means connected to said receiving means for indicating visually the reception of a reflected pulse to indicate a wave reflecting object, and means effectively connected to said radiating means for modulating said pulses with signals to be transmitted simultaneously.

2. A system for the simultaneous detection of wave reflecting objects and the transmission of intelligence including means for radiating discrete pulses at a pulse carrier frequency which may be filtered with respect to the frequency of said intelligence transmission, means for receiving said pulses after reflection, means connected to said radiating means and to said receiving means for indicating visually the reception of a pulse after reflection, and means effectively connected to said radiating means for modulating said pulses with signals to be transmitted simultaneously.

3. A system for the simultaneous detection of wave reflecting objects and the transmission of intelligence including means for generating discrete pulses of energy at a pulse carrier frequency which may be filtered with respect to the frequency of said intelligence transmission, means connected to said generating means for radiating said pulses, means for receiving said radiated pulses after their reflection from an object to be detected, an indicator connected to said receiving means for indicating visually the reception of said reflected pulses, and means effectively connected to said generating means for modulating said pulses with signals to be transmitted simultaneously for the communication of intelligence.

4. A system for the simultaneous detection of wave reflecting objects and the transmission of intelligence including means for generating discrete pulses of energy at a pulse carrier frequency which may be filtered with respect to the frequency of said intelligence transmission, means connected to said generating means for radiating said pulses, means for receiving said radiated pulses after their reflection from an object to be detected, an indicator connected to said receiving means for indicating visually the reception of said reflected pulses, and means effectively connected to said generating means for frequency modulating said pulses with signals to be transmitted simultaneously for the communication of intelligence.

5. A system for the simultaneous detection of wave reflecting objects and the transmission of intelligence including means for generating discrete pulses of energy at a pulse carrier frequency which may be filtered with respect to the frequency of said intelligence transmission, means connected to said generating means for radiating said pulses, means for receiving said radiated pulses after their reflection from an object to be detected, an indicator connected to said receiving means for indicating visually the reception of said reflected pulses, and means effectively connected to said generating means for amplitude modulating said pulses with signals to be transmitted simultaneously for the communication of intelligence.

6. A system for the simultaneous detection of wave reflecting objects and the transmission of intelligence including means for generating discrete pulses of energy at a pulse carrier frequency which may be filtered with respect to the frequency of said intelligence transmission, means connected to said generating means for radiating said pulses, means for receiving said radiated pulses after their reflection from an object to be detected, an indicator connected to said receiving means for indicating visually the time between the radiation and the reception of said reflected pulses, and means effectively connected to said generating means for modulating said pulses with signals to be transmitted simultaneously for the communication of intelligence.

7. A system for the simultaneous detection of wave reflecting objects and the transmission of intelligence including means for generating discrete pulses of energy at a pulse carrier frequency which may be filtered with respect to the frequency of said intelligence transmission, means connected to said generating means for radiating said pulses, means for receiving said radiated pulses after their reflection from an object to be detected, an indicator connected to said receiving means for indicating visually the time between the radiation and the reception of said reflected pulses, and means effectively connected to said generating means for frequency modulating said pulses with signals to be transmitted simultaneously for the communication of intelligence.

8. A system for the simultaneous detection of wave reflecting objects and the transmission of intelligence including means for generating discrete pulses of energy at a pulse carrier frequency which may be filtered with respect to the frequency of said intelligence transmission, means connected to said generating means for radiating said pulses, means for receiving said radiated pulses after their reflection from an object to be detected, an indicator connected to said receiving means for indicating visually the time between the radiation and the reception of said reflected pulses, and means effectively connected to said generating means for amplitude modulating said pulses with signals to be transmitted simultaneously for the communication of intelligence.

9. A system for the simultaneous detection of wave reflecting objects and the transmission of intelligence including means for radiating discrete pulses, means for receiving said pulses after reflection, means connected to said receiving means for indicating visually the reception of a reflected pulse to indicate a wave reflecting object, means effectively connected to said radiating means for modulating said pulses with signals to be transmitted simultaneously, and additional means connected to said receiving means and responsive to frequency modulated signals for receiving intelligence.

10. A system for the simultaneous detection of wave reflecting objects and the transmission of intelligence including means for generating discrete pulses of energy, means connected to said generating means for radiating said pulses, means for receiving said radiated pulses after their reflection from an object to be detected, an indicator connected to said receiving means for indicating visually the reception of said reflected pulses, means effectively connected to said generating means for modulating said pulses with signals to be transmitted simultaneously for the communication of intelligence, and a frequency responsive device connected to said receiving means for the reception of frequency modulation communication signals.

11. A system for the simultaneous detection of wave reflecting objects and the transmission of intelligence including means for generating discrete pulses of energy, means connected to said generating means for radiating said pulses, means for receiving said radiated pulses after their reflection from an object to be detected, an indicator connected to said receiving means for indicating visually the reception of said reflected pulses, means effectively connected to said generating means for modulating said pulses with signals to be transmitted simultaneously for the communication of intelligence, a limiter connected to said receiving means and a frequency responsive device connected to said limiter for the reception of frequency modulation communication signals.

12. A system for the simultaneous detection of wave reflecting objects and the transmission of intelligence including means for generating discrete pulses of energy, means connected to said generating means for radiating said pulses, means for receiving said radiated pulses after their reflection from an object to be detected, an indicator connected to said receiving means for indicating visually the reception of said reflected pulses, means effectively connected to said generating means for frequency modulating said pulses with signals to be transmitted simultaneously for the communication of intelligence, a limiter connected to said receiving means, and a frequency responsive device connected to said limiter for the reception of frequency modulation communication signals.

13. A system for the simultaneous detection of wave reflecting objects and the transmission of intelligence including means for generating discrete pulses of energy, means connected to said generating means for radiating said pulses, means for receiving said radiated pulses after their reflection from an object to be detected, an indicator connected to said receiving means for indicating visually the reception of said reflected pulses, means effectively connected to said generating means for amplitude modulating said pulses with signals to be transmitted simultaneously for the communication of intelligence, a limiter connected to said receiving means, and a frequency responsive device connected to said limiter for the reception of frequency modulation communication signals.

14. A system for the simultaneous detection of wave reflecting objects and the transmission of intelligence including means for generating discrete pulses of energy, means connected to said generating means for radiating said pulses, means for receiving said radiated pulses after their reflection from an object to be detected, an indicator connected to said receiving means for indicating visually the time between the radiation and the reception of said reflected pulses, means effectively connected to said generating means for frequency modulating said pulses with signals to be transmitted simultaneously for the communication of intelligence, a limiter connected to said receiving means, and a frequency responsive device connected to said limiter for the reception of frequency modulation communication signals.

15. A system for the simultaneous detection of wave reflecting objects and the transmission of intelligence including means for generating discrete pulses of energy, means connected to said generating means for radiating said pulses, means for receiving said radiated pulses after their reflection from an object to be detected, an indicator connected to said receiving means for indicating visually the time between the radiation and the reception of said reflected pulses, means effectively connected to said generating means for amplitude modulating said pulses with signals to be transmitted simultaneously for the communication of intelligence, a limiter connected to said receiving means, and a frequency responsive device connected to said limiter for the reception of frequency modulation communication signals.

16. The method of simultaneously detecting wave reflecting objects and communicating intelligence which includes generating discrete pulses of energy at a pulse carrier frequency which may be filtered with respect to the frequency of said intelligence communication, radiating said pulses, receiving said pulses after reflection, indicating visually the reception of said reflected pulses, and simultaneously modulating said pulses of energy with signals to be communicated.

17. The method of simultaneously detecting wave reflecting objects and communicating intelligence which includes generating discrete pulses of energy at a pulse carrier frequency which may be filtered with respect to the frequency of said intelligence communication, radiating said pulses, receiving said pulses after reflection, indicating the time between radiating and reception of said pulses, and simultaneously varying the frequency of said pulse energy as a function of signals to be communicated.

18. The method of simultaneously detecting wave reflecting objects and communicating intelligence which includes generating discrete pulses of energy at a pulse carrier frequency which may be filtered with respect to the frequency of said intelligence communication, radiating said pulses, receiving said pulses after reflection, indicating the time between radiating and reception of said pulses, and simultaneously varying the amplitude of said pulse energy as a function of signals to be communicated.

19. The method of simultaneously detecting wave reflecting objects and transmitting and receiving intelligence communicating signals which includes generating pulses of energy, radiating said pulses, receiving said pulses after reflection, indicating visually the reception of said reflected pulses, simultaneously receiving frequency modulated signals, indicating aurally reception of said frequency modulated signals, and simultaneously modulating said pulses of energy with communication signals to be transmitted.

20. A system for the simultaneous detection of wave reflecting objects and the transmission of intelligence including means for generating discrete pulses of energy at a pulse carrier frequency which may be filtered with respect to the frequency of said intelligence transmission, means connected to said generating means for radiating said pulses, means for receiving said radiated pulses after their reflection from an object to be detected, an indicator connected to said receiving means for indicating visually the distance of a reflecting object from said radiating means as a function of the time between the radiation and the reception of said reflected pulses, and means effectively connected to said generating means for modulating said pulses with signals to be transmitted simultaneously for the communication of intelligence.

21. A system for the simultaneous detection of wave reflecting objects and the transmission of intelligence including means for generating discrete pulses of energy at a pulse carrier frequency which may be filtered with respect to the frequency of said intelligence transmission, means connected to said generating means for radiating said pulses, means for receiving said radiated pulses after their reflection from an object to be detected, an indicator connected to said receiving means for indicating visually the distance of a reflecting object as a function of the time between the radiation and the reception of said reflected pulses, and means effectively connected to said generating means for frequency modulating said pulses with signals to be transmitted simultaneously for the communication of intelligence.

22. A system for the simultaneous detection of wave reflecting objects and the transmission of intelligence including means for generating discrete pulses of energy at a pulse carrier frequency which may be filtered with respect to the frequency of said intelligence transmission, means connected to said generating means for radiating said pulses, means for receiving said radiated pulses after their reflection from an object to be detected, an indicator connected to said receiving means for indicating visually the distance travelled by a pulse from its point of radiation to a reflecting object and from said reflecting object to said receiving means as a function of the time between the radiation and the reception of said reflected pulses, and means effectively connected to said generating means for amplitude modulating said pulses with signals to be transmitted simultaneously for the communication of intelligence.

IRVING WOLFF.